(12) United States Patent
Yoshida et al.

(10) Patent No.: US 7,039,268 B2
(45) Date of Patent: May 2, 2006

(54) OPTICAL DEVICE

(75) Inventors: Satoshi Yoshida, Tama (JP); Kenji Kondou, Chofu (JP); Osamu Imaki, Hachioji (JP); Yoshihiko Hamada, Akiruno (JP); Yoshichika Kato, Tachikawa (JP); Keiichi Mori, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 10/975,208

(22) Filed: Oct. 27, 2004

(65) Prior Publication Data

US 2005/0213876 A1    Sep. 29, 2005

Related U.S. Application Data

(63) Continuation-in-part of application No. 10/958,722, filed on Oct. 4, 2004, which is a continuation-in-part of application No. 10/957,284, filed on Oct. 1, 2004, which is a continuation-in-part of application No. 10/942,583, filed on Sep. 16, 2004.

(30) Foreign Application Priority Data

Mar. 29, 2004    (JP)    ............... 2004-095944

(51) Int. Cl.
    *G02B 6/26*    (2006.01)

(52) U.S. Cl. .......................................... 385/18; 385/16

(58) Field of Classification Search ............. 385/16–18
    See application file for complete search history.

(56) References Cited

U.S. PATENT DOCUMENTS 5,923,798 A * 7/1999 Aksyuk et al. ............... 385/19

(Continued)

FOREIGN PATENT DOCUMENTS

FR    2 860 305    4/2005

(Continued)

*Primary Examiner*—Ellen E. Kim
(74) *Attorney, Agent, or Firm*—David N. Lathrop, Esq.; Gallagher & Lathrop (57) ABSTRACT

An optical device formed on a substrate comprises: plural fiber channels formed in the top surface of the substrate; a mirror to be pushed into and pulled out of an optical path between optical fibers disposed in the fiber channels; a movable rod carrying at one end the mirror; a comb-type electrostatic actuator disposed in association with the intermediate portion of the movable rod, for moving the movable rod lengthwise thereof; and plural support beams disposed near the one and the other end of the movable rod on both sides of the point of application of driving force by the comb-type electrostatic actuator, for movably supporting the movable rod. The support beams support the movable rod at positions having line symmetry with respect to a center line parallel to the lengthwise direction of the movable rod, and points of supporting the movable rod by the plural support beams are symmetrical with respect to the point of application of the driving force by the comb-type electrostatic actuator. Even if the driving force by the comb-type electrostatic actuator contains a vector component of a direction different from the desired one in which to drive the movable rod, it is possible to suppress movement of the movable rod in other directions than the desired one to drive the movable rod.

6 Claims, 7 Drawing Sheets

U.S. PATENT DOCUMENTS

| | | |
|---|---|---|
| 6,108,466 A | 8/2000 | Aksyuk et al. |
| 6,114,794 A * | 9/2000 | Dhuler et al. ............... 310/307 |
| 6,229,640 B1 * | 5/2001 | Zhang ........................ 359/290 |
| 6,303,885 B1 * | 10/2001 | Hichwa et al. ............. 200/181 |
| 6,315,462 B1 | 11/2001 | Anthamatten et al. |
| 6,360,033 B1 * | 3/2002 | Lee et al. ..................... 385/18 |
| 6,404,969 B1 * | 6/2002 | Tayebati et al. ............. 385/140 |
| 6,459,845 B1 * | 10/2002 | Lee et al. ................... 385/140 |
| 6,815,865 B1 * | 11/2004 | Marxer ....................... 310/309 |
| 6,901,204 B1 * | 5/2005 | Hong et al. ................. 385/140 |
| 2002/0102059 A1 | 8/2002 | Cho et al. |

FOREIGN PATENT DOCUMENTS

| | | |
|---|---|---|
| WO | WO-01/11411 A1 | 2/2001 |
| WO | WO 02/075428 | 9/2002 |

\* cited by examiner

FORCE - DISPLACEMENT CHARACTERISTICS OF BISTABLE STRUCTURE

FIG. 6

RELATIONSHIPS BETWEEN WIDTH OF SUPPORT BEAM AND SELF-HOLDING FORCE (WHERE THE SHAPE OF THE LEAF-SPRING-LIKE SUPPORT BEAM IS NOT OPTIMIZED)

OPTICAL DEVICE

BACKGROUND OF THE INVENTION

The present invention relates to an optical device which has a mirror, support beams, an actuator and optical waveguides formed by semiconductor anisotropic etching or the like on a substrate and in which the mirror is pushed into and pulled out of the optical path between the waveguides to switch the optical path or control the quantity of light to be coupled to each incidence port.

Figure 1:
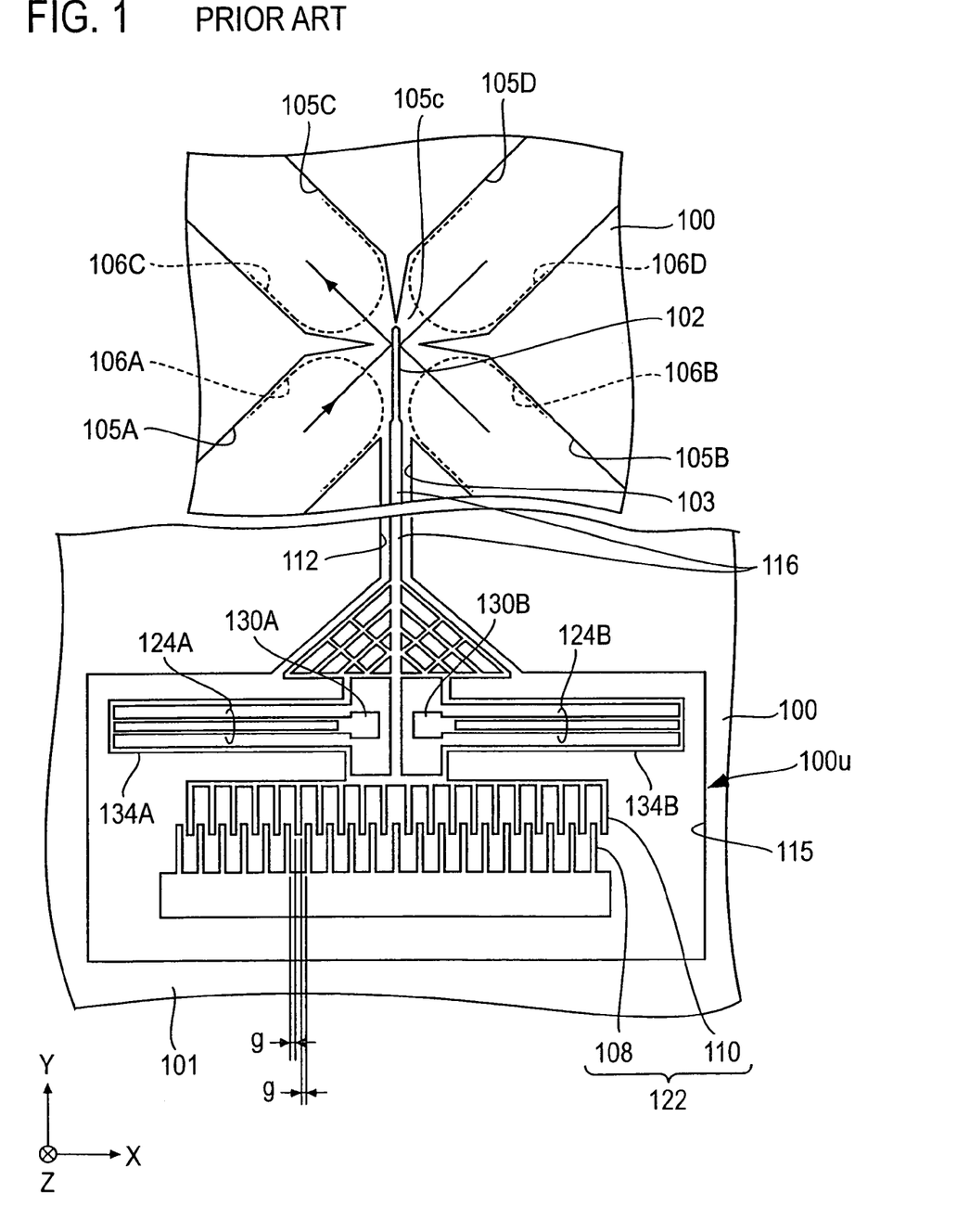
FIG. 1 is a plan view explanatory of showing the configuration of a conventional optical switch.

FIG. 1 shows, as a prior art example of an optical device of this kind, the configuration of a MEMS (Micro Electro Mechanical Systems) conventional optical switch described in International Publication Number WO 01/11411 A1 (published Feb. 15, 2001, hereinafter referred to as document 1).

In the top surface 100u of a plate-like flat substrate 100 (which is shown divided into two for ease of illustration but has a one-piece structure in practice) there are formed crosswise four waveguide (fiber) channels 105A to 105D coupled at one end together. An area defined by the fiber channels 105A and 105B perpendicular to each other is used as an actuator forming area 101.

In the actuator forming area 101 there is formed a trench or slot 112 cut in the substrate surface 100u at an angle of 45° to each of the fiber channels 105A and 105B. Disposed in the slot 112 is a movable rod 116. The movable rod 116 has coupled thereto on both sides support frames 134A and 134B at one end thereof, and the other ends of the support frames 134A and 134B are fixed to fixed support structures 130A and 130B via leaf-spring-like support beams 124A and 124B, respectively. Thus the movable rod 116 is supported in a manner to be movable lengthwise thereof in parallel to the substrate surface 100u.

Four optical fibers 106A to 106D are disposed in the fiber channels 105A to 105D, respectively. The movable rod 116 supports at one end thereof a mirror 102 to hold it initially in the intersection 105c of the optical axes of the optical fibers 106A to 106D extending radially therefrom, and the movable rod 116 couples at the other end to a comb-type electrostatic actuator 122.

The comb-type electrostatic actuator 122 is composed of a movable comb electrode 110 and a stationary comb electrode 108 interleaved with each other, disposed in the longitudinal direction of the movable rod 116 but extending in a direction perpendicular thereto. The movable comb electrode 110 is fixed to the movable rod 116, and the stationary comb electrode 108 is fixed to the bottom of a recess 115 formed in the surface 100u of the actuator forming area 101.

The recess 115 communicates with the slot 112, and the movable rod 116 extends into the recess 115. In the recess 115 there are disposed the comb-type electrostatic actuator 122, the support beams 124A, 124B, the support frames 134A, 134B, and the fixed support structures 130A, 130B. As is the case with the stationary comb electrode 108, the fixed support structures 130A and 1301B are fixed to the bottom of the recess 115, but the other structures, except the stationary comb electrode 108 and the fixed support structures 130A, 130B, are held above the bottom of the recess 115.

Voltage application across the movable and stationary comb electrodes 110 and 108 creates an electrostatic attractive force, which moves the movable rod 116 toward the stationary comb electrode 108 to pull the mirror 102 out of the intersection 105c. Upon stopping the voltage application, the movable rod 116 moves back toward the intersection 105c by elastic restoring force of the support beams 124A and 124B, bringing the mirror 102 back to its extended position in the intersection 105c.

With the mirror 102 pushed into the intersection 105c, light emitted from the optical fiber 106A, for instance, reflects off the mirror 102 for incidence on the optical fiber 106C, and light emitted from the optical fiber 106B reflects off the mirror 102 for incidence on the optical fiber 106D. With the mirror 102 pulled out of the intersection 105c, the light emitted from the optical fiber 106A is incident on the optical fiber 106D, and the light emitted from the optical fiber 106B is incident on the optical fiber 106C.

In the conventional optical device of the above-described configuration, the positional relationship between the point of application of driving force by the actuator to the movable portion and the points of supporting it by the support beams is not optimum in terms of dynamic characteristics of the movable portions.

Accordingly, when the driving force by the actuator contains a vector component in a direction different from a desired direction in which to drive the movable portion, there is the fear of pitching, rolling, or yawing of the movable portion.

In the conventional optical switch of FIG. 1, the position of the comb-type electrostatic actuator 122 relative to the movable portion including the mirror 102 and the movable rod 116 is disposed the other end of the movable rod 116 in opposing relation to the mirror 102 with the support beams 124A and 124B interposed between them. Now, let it be assumed that the comb-type electrostatic actuator 122, though just completed, is structurally nonuniform or asymmetrical in that the gaps g between sidewalls of adjacent comb fingers of the movable and stationary comb electrodes 110 and 108 interleaved with each other, which ought to be uniform, differ on the right and left of an arbitrary one of the adjacent comb fingers. Letting three orthogonal axes X, Y and Z be defined as shown in FIG. 1, and letting the direction of arrangement of the comb fingers and the longitudinal direction of the movable rod 116 be represented by X and Y, respectively, the driving force by the comb-type electrostatic actuator 122 contains a vector component of the X direction. The reason for this is that the electrostatic attractive force acting between comb fingers of different potentials is in inverse proportion to the width of the gap g between adjacent comb fingers, creating a larger attracting force between closely spaced-apart comb fingers with a small gap therebetween.

In this instance, since the point of application of the driving force is disposed at the end of the movable rod 116 opposite to the other end thereof carrying the mirror 102 as mentioned above, moment of force is applied to the supporting points of the support beams 124A and 124B, causing the movable portion including the movable comb electrode 110 to yaw about the Z axis. If this phenomenon becomes excessive, the movable and stationary comb electrodes 110 and 108 contact each other, developing a short circuit. Accordingly, the optical switch of FIG. 1 is inappropriate from the viewpoint of stability of the movable portion during switching operation.

SUMMARY OF THE INVENTION

It is therefore an object of the present invention to provide an optical device capable of inhibiting the movable portion from moving in other directions than a desired one and hence highly stable in operation.

According to the present invention, there is provided an optical device formed on a substrate, which comprises: at least two fiber channels formed in the top surface of the substrate; a mirror that is pushed into and pulled out of the optical path between optical fibers disposed in said fiber channels; a movable rod carrying at one end the mirror; a comb-type electrostatic actuator disposed in association with the intermediate portion of the movable rod, for moving the movable rod lengthwise thereof; and plural support beams disposed near the one and the other end of the movable rod on both sides of the point of application of driving force by the comb-type electrostatic actuator, for movably supporting the movable rod; wherein the support beams support the movable rod at positions having line symmetry with respect to a center line parallel to the lengthwise direction of the movable rod, and the points of supporting the movable rod by the plural support beams are symmetrical with respect to the point of application of the driving force by the comb-type electrostatic actuator.

According to the present invention, since the points of supporting the movable rod by the plural support beams are symmetrical with respect to the point of application of the driving force by the comb-type electrostatic actuator, even if the driving force by the comb-type electrostatic actuator contains a vector component of a direction different from a desired one in which to drive the movable rod, reaction forces by the plural support beams equally act on the unwanted vector component in the driving force, effectively preventing the movable rod from motion in other directions than the desired direction in which to drive the movable rod.

DESCRIPTION OF THE PREFERRED EMBODIMENTS

A description will be given first, with reference to FIGS. 2 to 4, an embodiment of the present invention.

Figure 2:
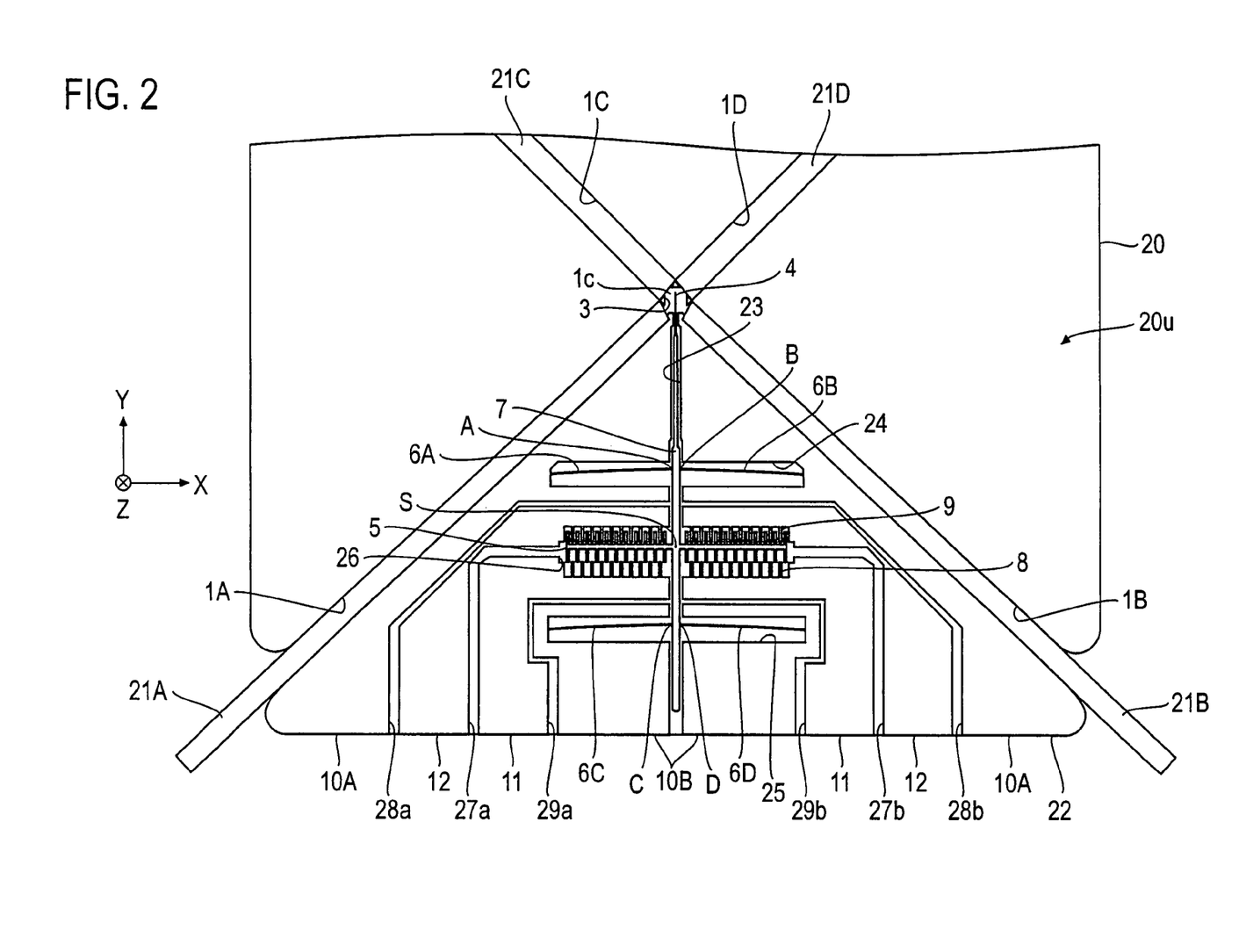
FIG. 2 is a plan view explanatory of a first embodiment of the optical device according to the present invention.

In the top surface 20u of a plate-like substrate 20 there are formed crosswise fiber channels 1A to 1D as depicted in FIG. 2. Optical fibers 21A to 21D are disposed in the fiber channels 1A to 1D extending radially from their intersection 1c as shown in FIG. 3. The optical fibers 21A to 21D are forced into the fiber channels 1A to 1D from above, and hence they are firmly held between sidewalls of the channels 1A and 1D, with their inner end faces urged against abutment shoulders 3 at four corners of the intersection 1c of the channels 1A to 1D so that the optical fibers 21A to 21D are positioned with respect to the substrate 20. The optical fibers 21A to 21D are each a collimation fiber; the optical device of this embodiment is designed on the assumption that the collimation fiber has a working distance (WD) of 160 μm, a beam waist diameter (BWD) of 15 μm and an end face tilt angle of 6°.

As shown in FIG. 2, the substrate surface 20u is divided by the channels 1A to 1D into four areas, one of which is used as an actuator forming area 22. In the actuator forming area 22 there is formed a slot 23 which communicates with the intersection 1c of the channels 1A to 1D and divides the actuator forming area 22 into two. Disposed in the slot 23 is a movable rod 7, which carries a mirror 4 at one end near the intersection 1c. The movable rod 7 is supported from anchors 10A and 10B formed in the actuator forming area 22, with leaf-spring-like support beams 6A to 6D coupled at one end to the intermediate portion of the movable rod 7 at two places on both sides thereof for its movement lengthwise of the movable rod 7 in parallel to the substrate surface 20u. The support beams 6A to 6D are adapted to switch between two stable states of deflection as described in detail later on. The support beams 6A and 6B are placed in a recess 24 formed in the anchor 10A, and the support beams 6C and 6D are placed in a recess 25 formed in the anchor 10B.

Between the support beams 6A, 6B and 6C, 6D is disposed a comb-type electrostatic actuator, which has its movable comb electrodes 5 fixed to both sides of the movable rod 7 widthwise thereof. The movable comb electrodes 5 have comb fingers extending toward the support beams 6A, 6B and 6C, 6D, and they are interleaved with first and second stationary comb electrodes 8 and 9. The first and second stationary comb electrodes 8 and 9 are fixed to electrode portions 11 and 12 formed in the actuator forming area 22.

The movable comb electrodes 5 and the first and second stationary comb electrodes 8 and 9 are disposed in a recess 26 formed between the electrode portions 11 and 12. Between the electrode portions 11 and 12 there are formed grooves 27a and 27b extending from both ends of the recess 26 to one marginal edge of the actuator forming area 22 as depicted in FIG. 2. Similarly, grooves 28a, 28b and 29a, 29b are also formed between the anchors 10A and the electrode portions 12 and between the anchors 10B and the electrode portions 11, respectively.

The anchors 10A, 10B and the electrode portions 11, 12 in the actuator forming area 22 are unitary with a single crystal silicon substrate with an insulating layer formed therebetween as described later on, but the other elements are supported slightly above the single crystal silicon substrate. As shown in FIG. 2, the three orthogonal axes X, Y and Z are defined as is the case with FIG. 1.

The optical device of such a structure as described above is formed using a three-layered SOI wafer which has a single crystal silicon layer deposited over a single crystal silicon substrate with an insulating layer of silicon dioxide sandwiched therebetween. The single crystal silicon substrate is, for example, 350 μm thick, the insulating layer is 3 μm thick, and the single crystal silicon layer (a silicon device layer) is 100 μm thick. The manufacture of the optical device using the SOI wafer generally involves such a sequence of steps as described below.

(1) A silicon dioxide film is formed all over the surface of a silicon device layer.

(2) The silicon dioxide film is patterned by photolithography and etching.

(3) Anisotropic etching of the silicon device layer is performed by DRIE (Deep Reactive Ion Etching) or similar techniques, using the patterned silicon dioxide film as a mask.

(4) An insulating layer between the single crystal silicon substrate and the silicon device layer is selectively etched away by use of an appropriate etchant to form the movable parts or elements. In this instance, a proper selection of the time for etching leaves the insulating layer underlying the stationary parts or elements unremoved to form narrow or thin movable structures on the one hand and wide stationary structures on the other hand.

(5) The surfaces of the mirror and required areas of the electrode portions are metalized with a metal of high reflectivity, such as gold (Au).

Since the mirror 4 needs to be held in optical alignment on the optical axis with the highest possible degree of accuracy when it reflects light in the intersection 1c, the optical device of this embodiment is fabricated with the mirror 4 held initially in the intersection 1c.

Next, a description will be given of the basic operation of the optical device according to this embodiment. In the initial state (first stable state) of the optical device just completed the mirror 4 lies in the intersection 1c. In this instance, light emitted from the optical fiber 21A reflects off the mirror 4 and impinges on the optical fiber 21C. Light emitted from the optical fiber 21B reflects off the mirror 4 and impinges on the optical fiber 21D.

Applying voltage to the first stationary comb electrodes 8 while grounding the second stationary electrodes 9 and the anchors 10A, 10B electrically connected to the movable comb electrodes 5 via the movable rod 7 and the support beams 6A to 6D, an electrostatic attractive force is created between the first stationary comb electrodes 8 and the movable comb electrodes 5, and when the attractive force is greater than the force for holding the support beams 6A to 6D in the first stable state, the support beams 6A to 6D reverse to the second stable state, and remains self-held even after interruption of the voltage application. At this time, the mirror 4 pulled out of the intersection 1c, in which case lights emitted from the optical fibers 21A and 21B impinges intact on the optical fibers 21D and 21C, respectively, without reflecting off the mirror 4. Applying voltage to the second stationary comb electrodes 9 while grounding the anchors 10A, 10B and the first stationary comb electrodes 8, an electrostatic attractive force is generated between the second stationary comb electrodes 9 and the movable comb electrodes 5, and if the attractive force is greater than the force for holding the support beams 6A to 6D in the second stable state, they return to the first stable state.

The voltage application across the first or second stationary comb electrodes 8 or 9 and the movable comb electrodes 5 can be achieved by voltage application across the electrode portions 11 or 12 and the anchors 10A and 10B.

A detailed description will be given of the function of each element of the optical device according to this embodiment. This embodiment uses, as the optical fibers 21A to 21D, collimation fibers having their end faces ground aslant with the intention of suppressing return loss which would otherwise be caused by the Fresnel reflection in the end face of each optical fiber. The four fiber channels 1A to 1D are formed so that the optical coupling efficient becomes maximum when the angle between the lightwaves incident on and reflecting off the mirror 4 is 90°. This is for the reasons given below.

During packaging the optical device of this embodiment, if the optical fibers are reoriented to bring their end faces into squarely-opposed relation, the optical fibers need to turn accordingly—this inevitably makes the package bulky. Hence, from the viewpoint of downsizing of the package, it is advantageous to make acute or obtuse the angle between the lightwaves incident on and reflecting off the mirror 4. However, the acute angle between the lightwaves incident on and reflecting off the mirror 4 causes an increase in the working distance (WD) of light.

In general, to increase the working distance of light requires a lens design that allows widening of the beam waist diameter (BWD), which leads to the necessary for a corresponding increase in the mirror driving stroke as well. The increase in the travel distance of the mirror 4 degrades the rigidity of the movable parts, giving rise to a problem in the mechanical reliability of the device in terms of shock resistance, for example.

Even if the lens system can be so deigned as to increase the working distance without widening the beam waist diameter, the required accuracy for alignment in the optical system becomes higher accordingly.

On the other hand, when the angle between the lightwaves incident on and reflecting off the mirror 4 is obtuse, the beam spot of the incident light on the mirror 4 becomes more elliptic in the direction of travel of the mirror 4, making it necessary to increase the travel distance of the mirror 4.

All factors considered, in the optical device of this embodiment the fiber channels 1A to 1D are formed to provide the maximum optical coupling efficiency when the angle between the lightwaves incident on and reflecting off the mirror 4 is 90° as described above. In the case of using the optical fibers having their end faces ground aslant to serve the afore-mentioned purpose, the angle between the optical fiber which emits light for incidence on the mirror 4 and the optical fiber which receives the light reflecting off the mirror 4 is acute to some extent; this, in terms of package downsizing, is somewhat advantageous over the arrangement of fiber channels at 90° intervals.

With end faces of optical fibers ground aslant, the angle θ between the optical fiber emitting light for incidence on the mirror 4 and the optical fiber receiving light reflecting off the mirror 4 can be given by the following equation.

$$\theta = \pi/2 - 2\{\sin^{-1}(n \sin \theta') - \theta'\}$$

where θ' is the tilt angle of the ground end face of the optical fiber and n is the refractive index of the fiber core. The following is two conditions for the arrangement of optical fibers.

Figure 3:
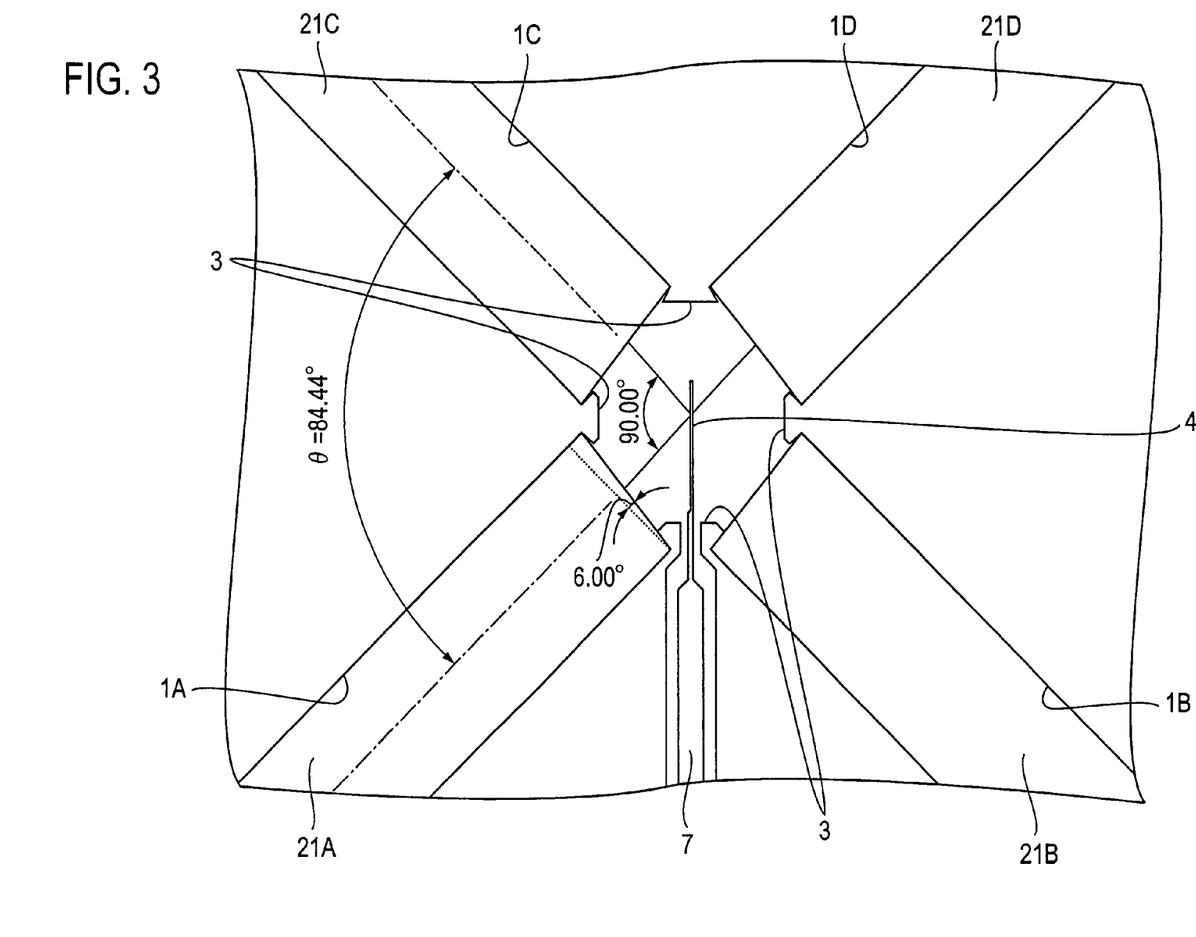
FIG. 3 is an enlarged plan view showing the construction of the optical device of FIG. 2 around the intersection of fiber channels formed crosswise.
Figure 4:
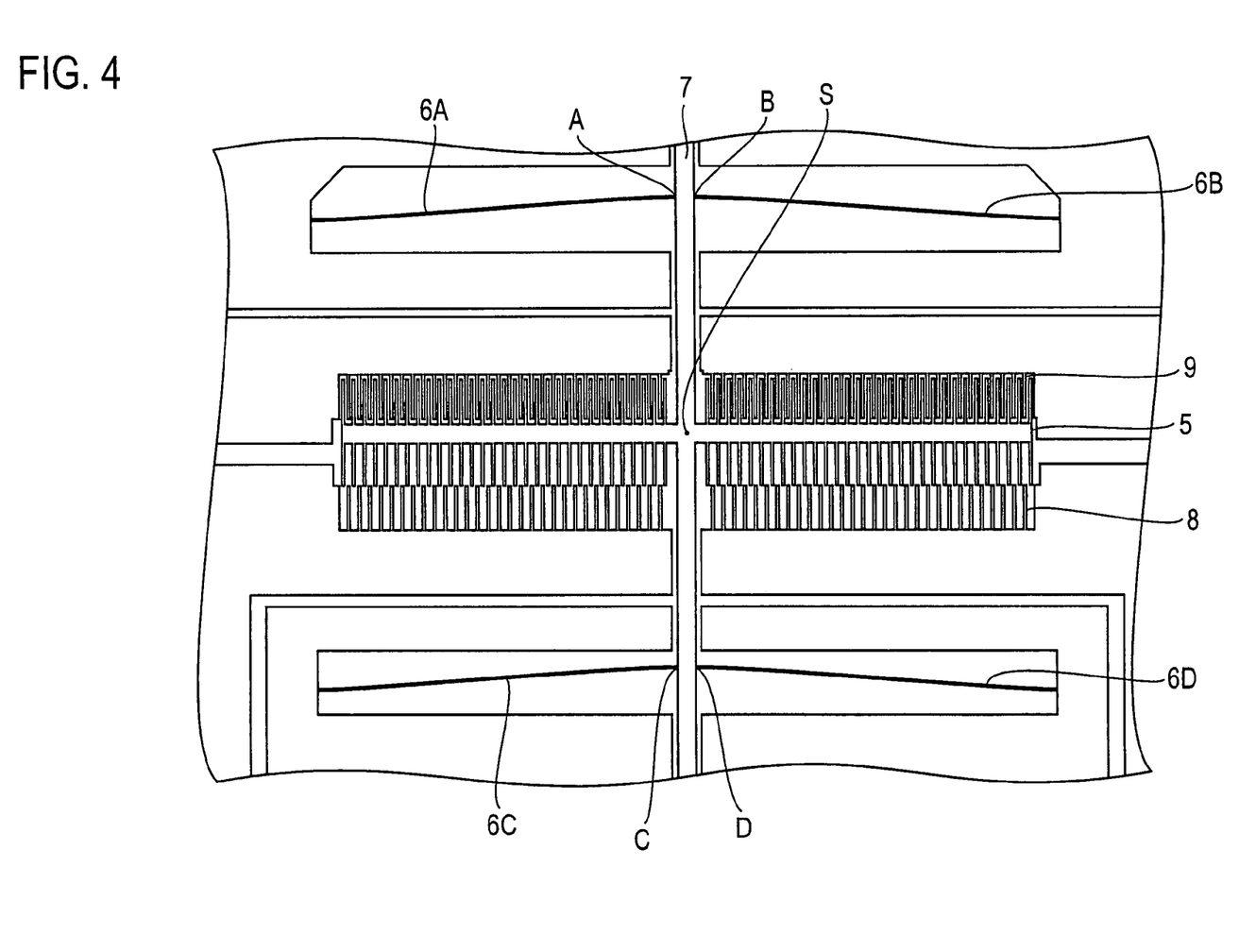
FIG. 4 is an enlarged plan view showing in detail an comb-type electrostatic actuator and support beams in the optical device of FIG. 2.

(1) The light-emitting and light-receiving optical fibers are disposed with acute-angled corners of their end faces held adjacent each other as shown in FIG. 3.

(2) The angle between lightwaves incident on and reflecting off the mirror 4 is 90° as shown in FIG. 3.

In the illustrated example, setting, for example, θ'=6° and n=1.46, the angles θ between the axes of the optical fibers 21A, 21C and 21B, 21D are 84.44°, and hence they are somewhat acute.

In the optical device of this embodiment, the support beams 6A to 6D have line symmetry with respect to the center line parallel to the lengthwise direction of the movable rod 7, and points A, B, C and D for supporting the movable rod 7 by the four support beams 6A, 6B, 6C and 6D (which supporting points A to D are points of application of reaction forces by the support beams) are disposed at positions symmetrical with respect to the coupling portion of the movable comb electrodes 5 to the movable rod 7 (that is, a point S of application of the force for driving the movable rod 7).

Furthermore, the optical device of this example is designed so that the point S of application of the rod driving force virtually coincides with the center of gravity of the movable portion composed of the mirror 4, the movable rod 7 and the movable comb electrodes 5. With such a structure, even if the driving force of the comb-type electrostatic actuator contains a vector component of a direction different from that in which to drive the movable portion, reactive forces of the four support beams equally act on the unnecessary vector component of the rod driving force, effectively preventing the movable portion from moving in other directions than the desired one. Accordingly, the optical device of this embodiment is free from pitching, rolling, and yawing or similar rotational motion, and hence it is highly stable in operation.

Moreover, even if the optical device undergoes a shock or similar disturbance, it is possible to effective suppress unnecessary movement of the movable portion by the following structural features.

(1) The four support beams 6A, 6B, 6C and 6D are disposed at positions symmetrical with respect to the gravity of the movable portion.

(2) The movable comb electrodes 5, which are heavy structures, are supported equally by the four support beams 6A, 6B, 6C and 6D.

Figure 5:
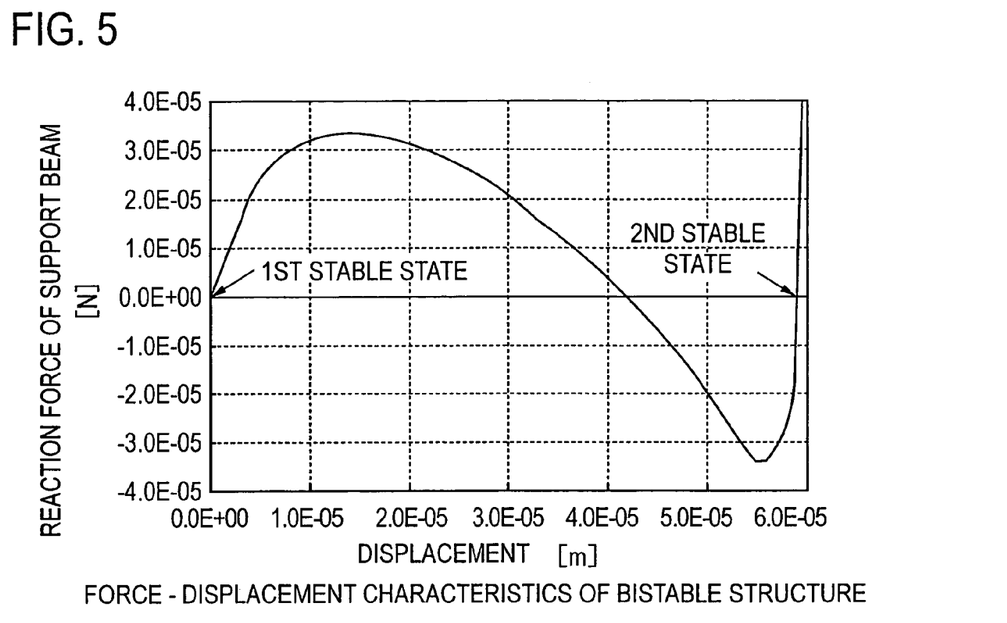
FIG. 5 is a graph showing, by way of example, a force-displacement characteristic curve of the support beam in the optical device of FIG. 2.

Besides, the optical device of this embodiment adopts a "bistable" structure that enables the device to remain self-holding in the two stable states through buckling of the four support beams 6A to 6D. The "bistable" structure can be appreciated in terms of its force-displacement characteristics (FIG. 5). As the support beams 6A to 6D in their initial positions are displaced in the direction to retract the mirror 4 from the intersection 1c, the reaction forces of the support beams 6A to 6D monotonously increase in the initial stage while their displacement is small, but become maximum when the buckling load is reached, after which the reaction forces monotonously decrease down to the minimum with an increase in displacement, thereafter increasing again. In this way, the force-displacement characteristics vary between the maximum and the minimum value, and the support beams are allowed to remain self-holding in either one of the two stable state only when the minimum value is negative.

In FIG. 5, the origin indicating the initial state of each support beam corresponds to the first stable state, and the position where the reaction force is reduced down to zero after reaching the minimum value corresponds to the second stable state, whereas the maximum value indicates the force for holding the support beams in the first stable state and the minimum value indicates the force for holding the support beams in the second stable state. In this embodiment, the shapes of the support beams 6A to 6D are optimized especially by the following procedure to provide substantially equal force for holding the support beams in the first and second stable as depicted in FIG. 5. This embodiment sets inflection points of each leaf-spring-like support beam at points each spaced from its either end by a quarter of its entire length (an X component), and selects the condition under which the ratio between the holding forces for the both stable state is virtually 1 using, as a parameter, the radius of curvature for buckling. The support beam extends perpendicular (the X direction) to the direction in which to drive the mirror 4. The mirror driving stroke, that is, the travel distance of the mirror 4, is controlled by changing the difference in position between the both ends of the support beam in the Y direction. In this embodiment the mirror driving stroke is about 60 µm. To make equal the holding forces for the both stable states is of importance for the reason given below.

The support beams 6A to 6D serve to support the movable portion, and hence they are required to be flexible in the direction of travel of the movable rod 7. To meet this requirement, the width of each support beam is minimized in the optical device of this embodiment. Furthermore, when the support beam is rectangular in cross section, its flexural rigidity is in proportion to the cube of the beam width; therefore, the support beam holding force is very sensitive to the beam width. Accordingly, the allowable margin of the beam width greatly affects the fabrication yield of optical devices of this kind. The upper limit of the beam width is limited by the maximum driving force of the actuator, whereas the lower limit is determined by the shock resistance of the support beam (the limit of shock at which the support beam stays stable).

Figure 6:
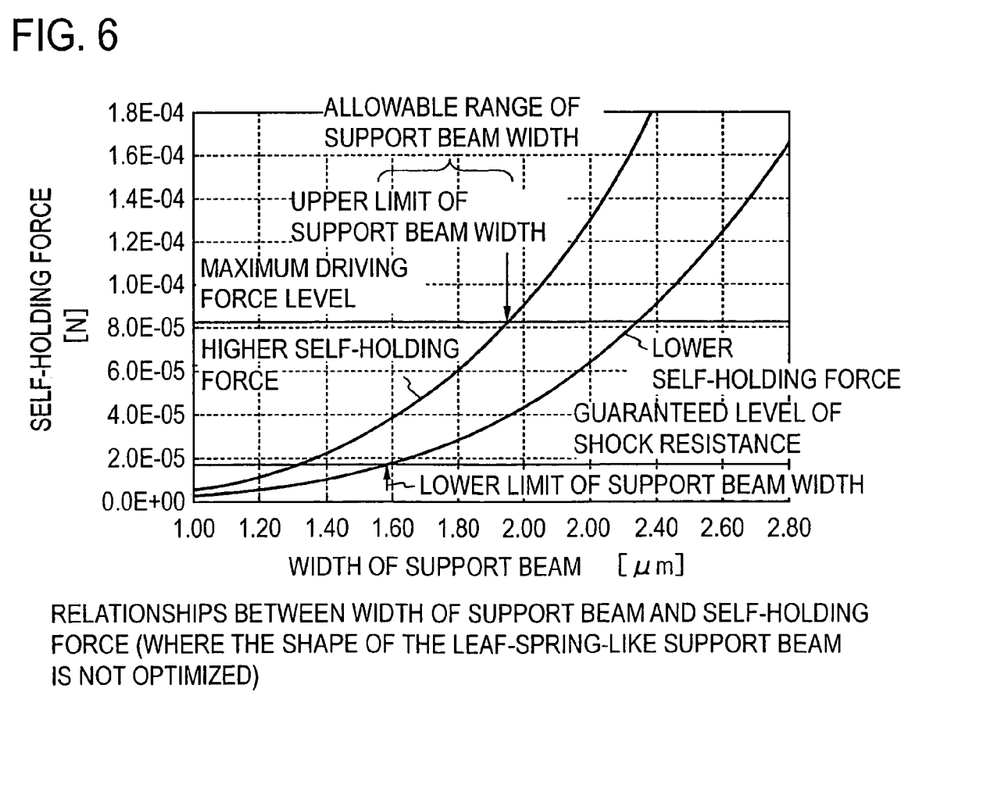
FIG. 6 is a graph showing the relationships between the width and self-holding force of the support beam, for explaining the allowance of the beam width in the case where the holding forces for first and second stable states of the support beam differ.

As shown in FIG. 6, when the holding forces for the first and second stable states differs greatly, the upper limit of the beam width is limited in terms of the relationship between the higher holding force and the maximum driving force of the actuator, and the lower limit is determined in terms of the relationship between the lower holding force and the shock resistance. Accordingly, the margin of allowance of the beam width inevitably decreases. In other words, equalization of the holding forces for the both stable states increases the margin of allowance of the beam width, hence providing improved yield in the manufacture of optical devices.

With such design principles as described above, the optical device of this embodiment achieves the following characteristics in communication bands S, C and L.

(1) Insertion Loss: 0.7 dB or below
(2) Polarization Dependence Loss: 0.1 dB or below
(3) Return Loss: 50 dB or more
(4) Crosstalk: 70 dB or more
(5) Switching Time: 1 ms or less An indication of the effective suppression of unwanted vector components in the actuator driving force by the four support beams 6A to 6D is smooth movement of the movable portion in the Y direction in FIG. 2. In an endurance test by repeated switching operations no particular abnormality in the characteristics of the optical device of this embodiment was found after one billion times of switching. To demonstrate the effects by optimizing the shapes of the support beams 6A to 6D to thereby provide substantially equal forces for holding them in the first and second stable states, samples of optical devices according to this embodiment were screened on the following two criteria:

(1) To maintain of the self-holding function when given an impact of 50 G; and
(2) To stably operate on a drive voltage of 75 V.

All of 140 samples of the same lot met the criteria. Without optimization of the beam configuration, 15 samples among 140 samples did not met either one of the two criteria; that is, the rate of passing the screening was approximately 90%. This suggests that substantial equalization of the holding forces for the first and second stable state increases the margin of allowance of the beam width.

Figure 7:
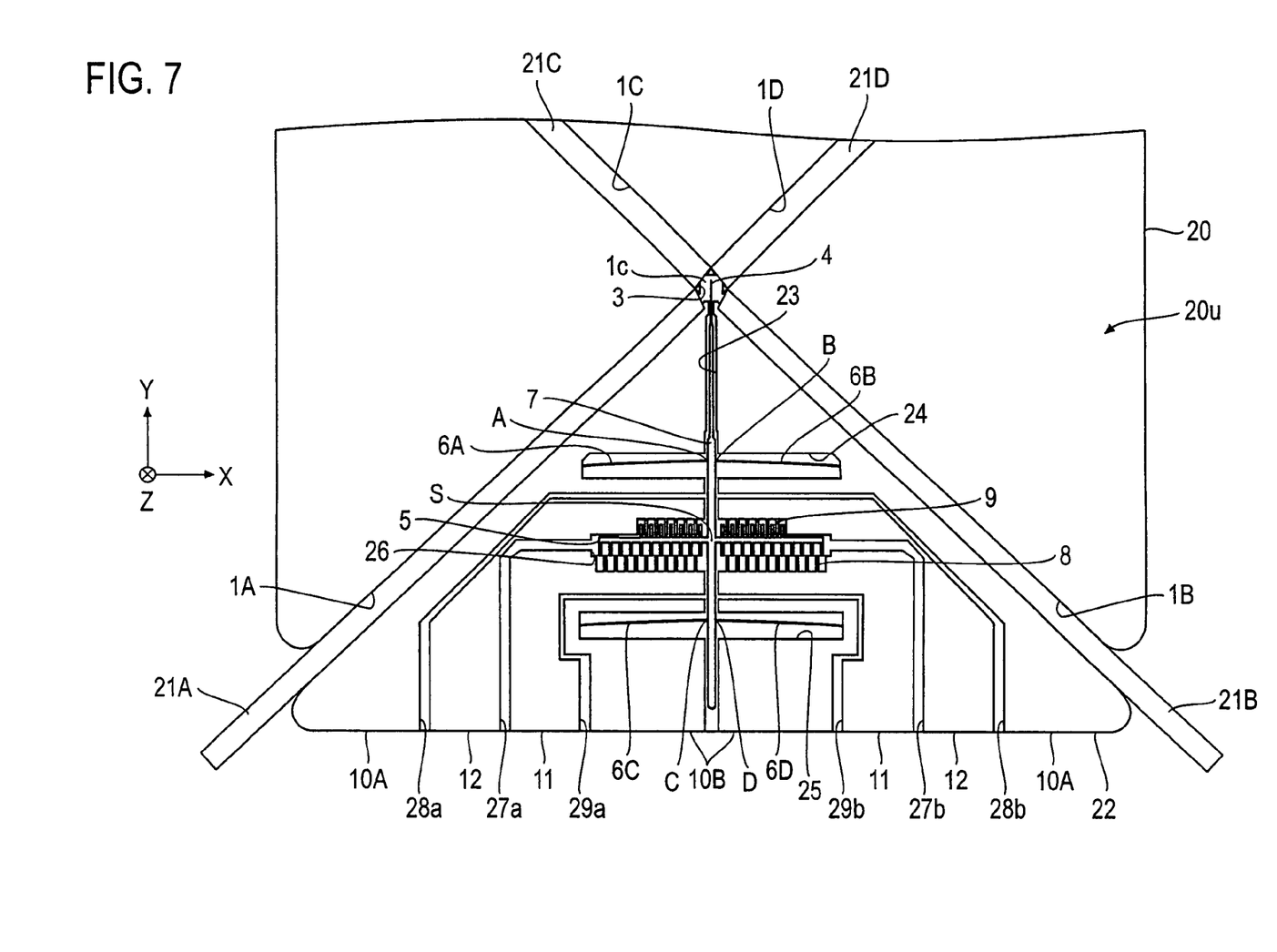
FIG. 7 is a plan view explanatory of a second embodiment of the optical device according to the present invention.
Figure 8:
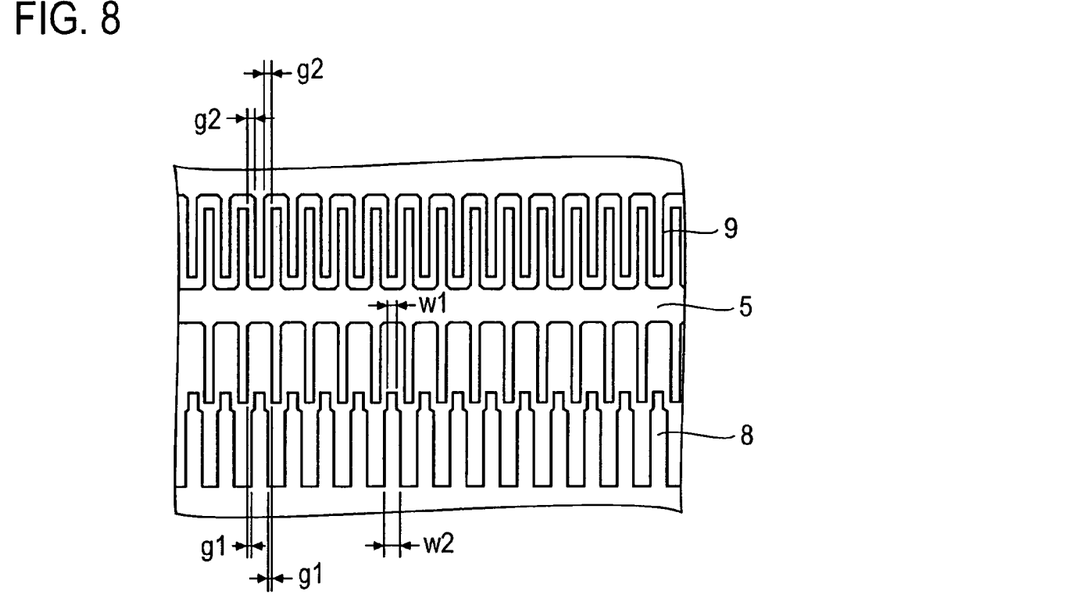
FIG. 8 is an enlarged plan view showing in detail the comb-type electrostatic actuator of the optical device of FIG. 7.

A description will be given of a modified form (a second embodiment) of the optical device of the first embodiment, which modification can be expected to exhibit the same characteristics as those obtainable with the first embodiment. Now, let: F1 represent the first stable state holding force, F2 represent the second stable holding force; N1 represent the number of comb fingers of the comb-type electrostatic actuator for switching from the first stable state to the second stable state (more specifically, the number of comb fingers of the first stationary comb electrodes 8 and the movable comb electrodes 5); g1 represent the gap between adjacent comb fingers of the first stationary comb electrodes 8 and the movable comb electrodes 5; N2 represent the number of comb fingers of the comb-type electrostatic actuator for switching from the second stable state to the first stable state (more specifically, the number of comb fingers of the second stationary comb electrodes 9 and the movable comb electrodes 5); and g2 represent the gap between adjacent comb fingers of the second stationary comb electrodes 9 and the movable comb electrodes 5. According to the second embodiment, comb-finger parameters (the number of comb fingers and the gap between adjacent comb fingers) of such a comb-type electrostatic actuator as shown in FIGS. 7 and 8 are optimized so that F1·g1/N1 and F2·g2/N2 become equal to each other. This means equalization of the voltage for switching from the first to the second stable state and the voltage for switching from the second to the first stable state.

The optical device of this embodiment is exactly identical in construction with the first embodiment except the support beams 6A to 6D and the comb-finger parameters. The optimization of the comb-finger parameters will be described below in more detail.

Figure 9:
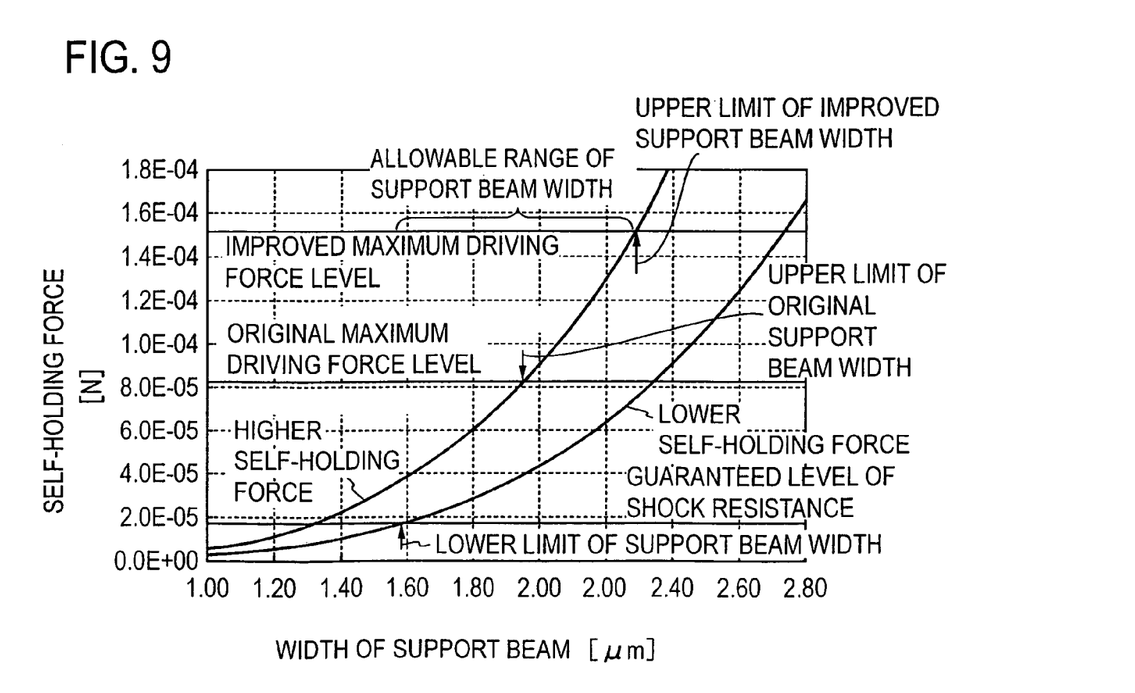
FIG. 9 is a graph showing the relationships between the width and self-holding force of the support beam, for explaining the allowance of the beam width in the optical device shown in FIG. 7.

In this embodiment, since the first stable state holding force is about twice greater than the second stable state holding force (F1/F2=2), the number of comb fingers of the combs, which contribute to the switching in the direction from the first to the second stable state, is increased about 1.2 times that in the opposite direction (N1/N2=1.2) and the gap between adjacent comb fingers is decreased about 0.6 times that in the opposite direction (g1/g2=0.6) so that the force for switching from the first to the second stable state becomes approximately twice the force for switching in the opposite direction. This is intended to obtain the same effects as are obtainable with the first embodiment that optimizes the support beam configuration to provide equal forces for holding the first and second stable states. With the above device configuration, it is possible to raise the upper limit of the beam width that is limited by the relationship between the greater holding force and the maximum driving force of the actuator (allowable driving voltage), as shown in FIG. 9.

In the comb-type electrostatic actuator, the smaller the gap between adjacent comb finger, the greater the electrostatic attractive force; hence, in the case of designing this kind of actuator, the gap between adjacent comb fingers is reduced down to the minimum trench width feasible by the optical device manufacturing process. That is, it is no exaggeration to state that the gap between adjacent comb fingers is a parameter that is limited by the working ability of the manufacturing process. In this embodiment, since the first stable state holding force is greater than the second stable state holding force, the gap between adjacent comb fingers, which contributes to switching from the first to the second stable state, is reduced. This can be done because the opposing combs are not deeply interleaved with each other in the initial state in which the mirror lies in the intersection 1c. In this case, the first stationary comb electrode 8 has two different widths (W1, W2), by which it is possible to reduce the gap between adjacent comb fingers without being affected by the limit of working ability of the manufacturing process. And, since the support beams 6A to 6D usually create a large force for holding the first stable state or under the initial condition, it can be said that the above-described design schemes are effective in many instances.

In this embodiment, the number of comb fingers (of the second stationary comb electrodes 9), which contribute to switching from the second to the first stable state, is not so large as the number of comb fingers (of the first stationary comb electrodes 8) which contribute to switching from the first to the second stable state. The reason for this is that an indiscriminate increase in the number of comb fingers of the second stationary comb electrodes 8 increases the equivalent mass of the movable portion and hence impairs the mechanical reliability such shock resistance.

The optical device according to the present invention can be used, for example, in the fields associated with optical communications.

What is claimed is:

1. An optical device formed on a substrate, said optical device comprising:
    at least two fiber channels formed in the top surface of said substrate;
    a mirror that is pushed into and pulled out of an optical path between optical fibers disposed in said fiber channels;
    a movable rod carrying at one end said mirror;
    a comb-type electrostatic actuator disposed in association with the intermediate portion of said movable rod, for moving said movable rod lengthwise thereof; and
    plural support beams disposed near the one and the other end of said movable rod on both sides of the point of application of driving force by said comb-type electrostatic actuator, for movably supporting said movable rod;
    wherein said support beams support said movable rod at positions having line symmetry with respect to a center line parallel to the lengthwise direction of said movable rod, and the points of supporting said movable rod by said plural support beams are symmetrical with respect to said point of application of the driving force by said comb-type electrostatic actuator.

2. The optical device of claim 1, wherein said point of application of the driving force by said comb-type electrostatic actuator coincides with the center of gravity of a movable portion including said movable rod carrying said mirror and movable comb electrodes of said comb-type electrostatic actuator fixed to said movable rod.

3. The optical device of claim 1, wherein the fiber core end face of each of said optical fibers disposed in said fiber channels has a refractive index n and said end face has a tilt angle $\theta'$ with respect to a plane perpendicular to the axis of said each optical fiber, and said fiber channels are formed so that the angle $\theta$ between a light-emitting one of said optical fibers and the other optical fiber for receiving light reflecting off said mirror satisfies the following condition to provide an angle of 90° between light incident on said mirror and light reflecting off said mirror:

$$\theta = \pi/2 - 2\{\sin^{-1}(n \sin \theta') - \theta'\}$$

4. The optical device of claim 1, wherein said plural support beams switch between two stable states of flection through reversal, and wherein, letting the self-holding force for said first stable state be represented by F1, the self-holding force for said second stable state be represented by F2, the number of comb fingers and the gap between adjacent comb fingers of said comb-type electrostatic actuator for switching said plural support beams from said first stable state to said second stable state be represented by N1 and g1, respectively, and the number of comb fingers and the gap between adjacent comb fingers of said comb-type electrostatic actuator for switching said plural support beams from said second stable state to said first stable state be represented by N2 and g2, respectively, $F1 \cdot g1/N1$ and $F2 \cdot g2/N2$ are nearly equal to each other.

5. The optical device of claim 2, wherein said plural support beams switch between two stable states of flection through reversal, and wherein, letting the self-holding force for said first stable state be represented by F1, the self-holding force for said second stable state be represented by F2, the number of comb fingers and the gap between adjacent comb fingers of said comb-type electrostatic actuator for switching said plural support beams from said first stable state to said second stable state be represented by N1 and g1, respectively, and the number of comb fingers and the gap between adjacent comb fingers of said comb-type electrostatic actuator for switching said plural support beams from said second stable state to said first stable state be represented by N2 and g2, respectively, $F1 \cdot g1/N1$ and $F2 \cdot g2/N2$ are nearly equal to each other.

6. The optical device of claim 3, wherein said plural support beams switch between two stable states of flection through reversal, and wherein, letting the self-holding force for said first stable state be represented by F1, the self-holding force for said second stable state be represented by F2, the number of comb fingers and the gap between adjacent comb fingers of said comb-type electrostatic actuator for switching said plural support beams from said first stable state to said second stable state be represented by N1 and g1, respectively, and the number of comb fingers and the gap between adjacent comb fingers of said comb-type electrostatic actuator for switching said plural support beams from said second stable state to said first stable state be represented by N2 and g2, respectively, $F1 \cdot g1/N1$ and $F2 \cdot g2/N2$ are nearly equal to each other.

* * * * *